(12) United States Patent
Tsunashima

(10) Patent No.: US 6,169,637 B1
(45) Date of Patent: Jan. 2, 2001

(54) CATADIOPTRIC LENS

(75) Inventor: Teruyoshi Tsunashima, Tokyo (JP)

(73) Assignee: Nikon Corporation, Tokyo (JP)

( * ) Notice: Under 35 U.S.C. 154(b), the term of this patent shall be extended for 0 days.

(21) Appl. No.: 09/304,772

(22) Filed: May 4, 1999

(30) Foreign Application Priority Data

May 1, 1998 (JP) .................................................. 10-137432

(51) Int. Cl.$^7$ .................................................. G02B 17/00
(52) U.S. Cl. .......................... 359/726; 359/731; 359/732; 359/799
(58) Field of Search .................................... 359/731, 730, 359/732, 726, 799, 356

(56) References Cited

U.S. PATENT DOCUMENTS 5,159,495 * 10/1992 Hamblen ............................... 359/731
5,793,538    8/1998 Cameron et al. ..................... 359/731

* cited by examiner

Primary Examiner—Scott J. Sugarman
Assistant Examiner—Michael A. Lucas
(74) Attorney, Agent, or Firm—Vorys, Sater, Seymour and Pease LLP

(57) ABSTRACT

A catadioptric lens (10) comprising, along an optical axis (AX), a first lens group ($L_1$) having an objectwise concave annular incident surface (SI) upon which light from an object is first incident, and a most imagewise lens surface (16). The catadioptric lens further includes an annular main mirror (MM) arranged imagewise of the first lens group and having an objectwise concave reflective surface ($R_1$) that reflects light objectwise. A secondary mirror (MS) is located objectwise of the annular main mirror and has an imagewise convex reflective surface (R2) that reflects light imagewise. The first lens group has a glass optical path from the incident surface to the main mirror to the secondary mirror and to the most imagewise lens surface of the first lens group. The catadioptric lens may also include a second lens group $L_2$ imagewise of the first lens group. The second lens group may include two or more lenses, and preferably includes a cemented doublet ($L_{34}$, $L_{35}$). The catadioptric lens also preferably satisfies one or more of a number of design conditions.

25 Claims, 14 Drawing Sheets

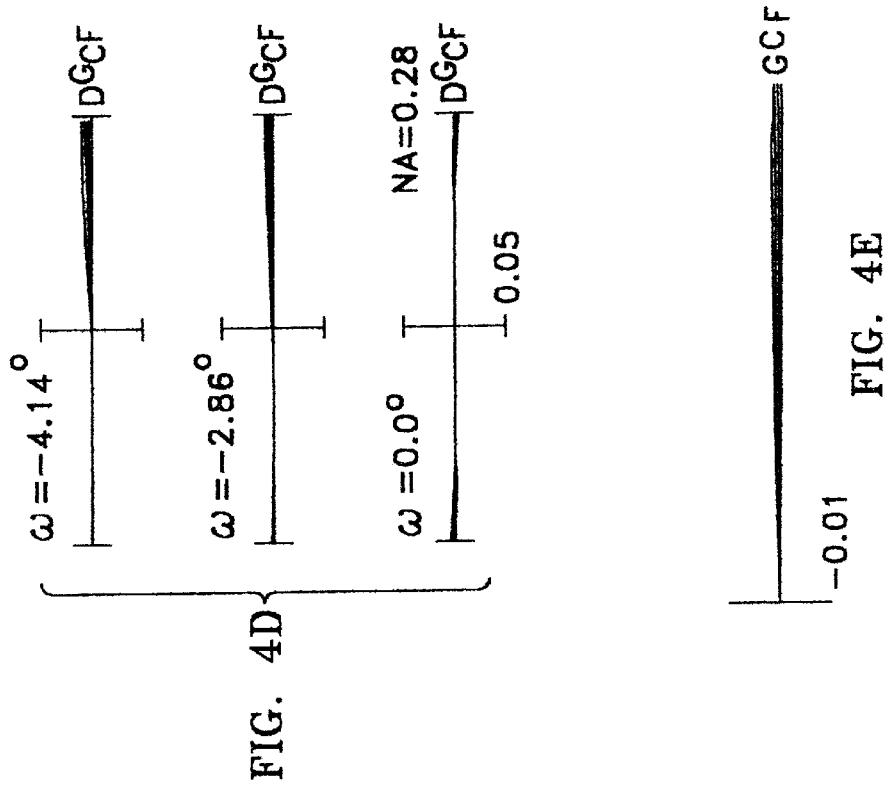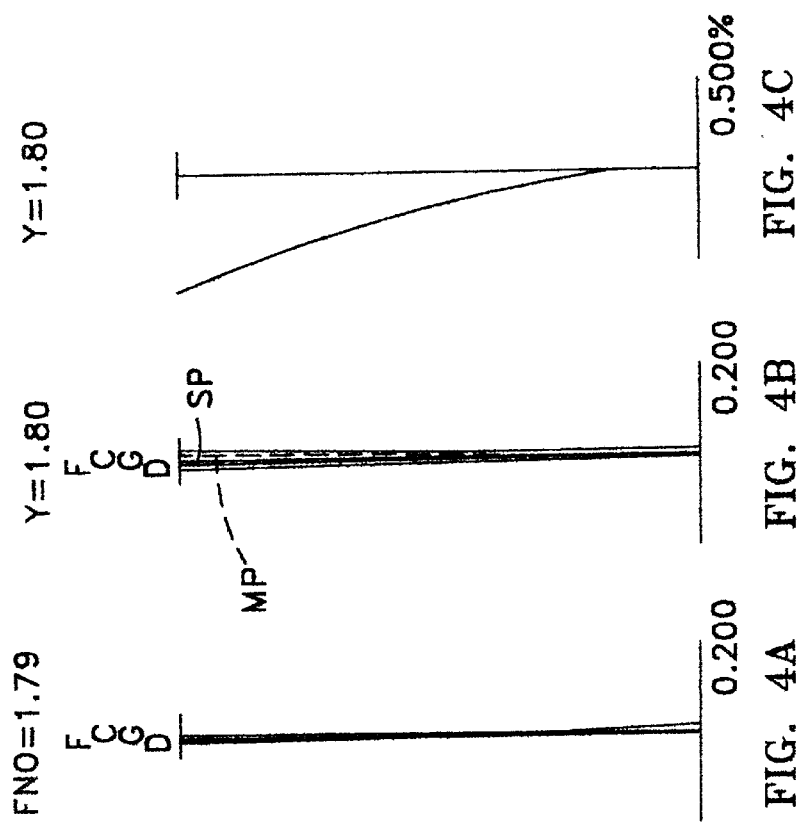

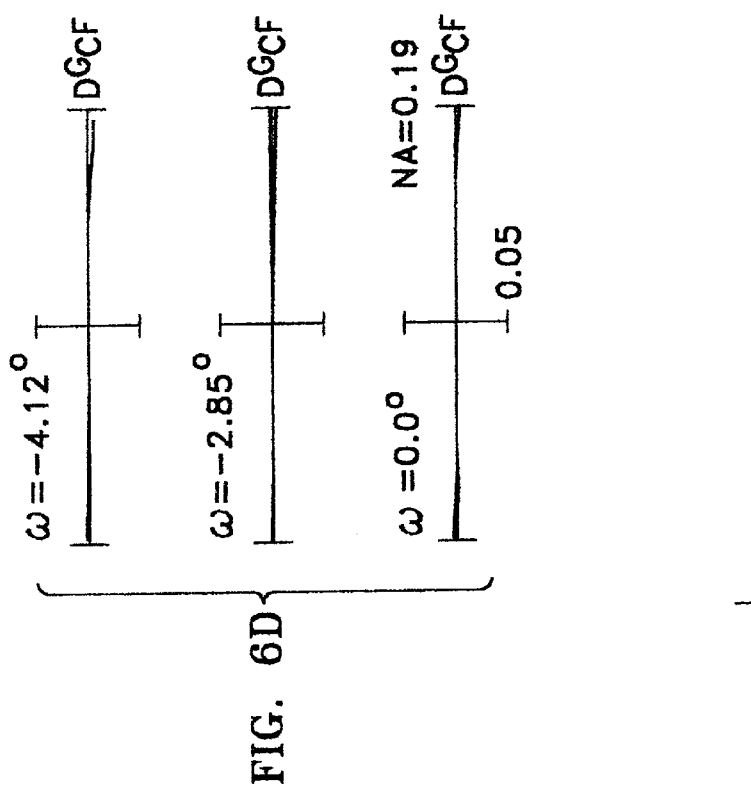
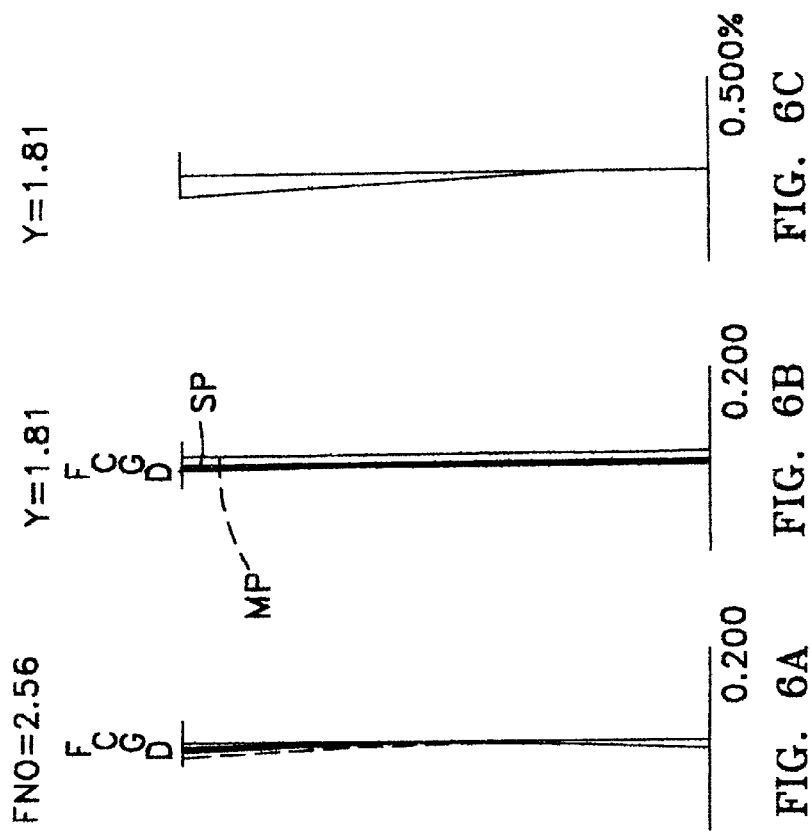

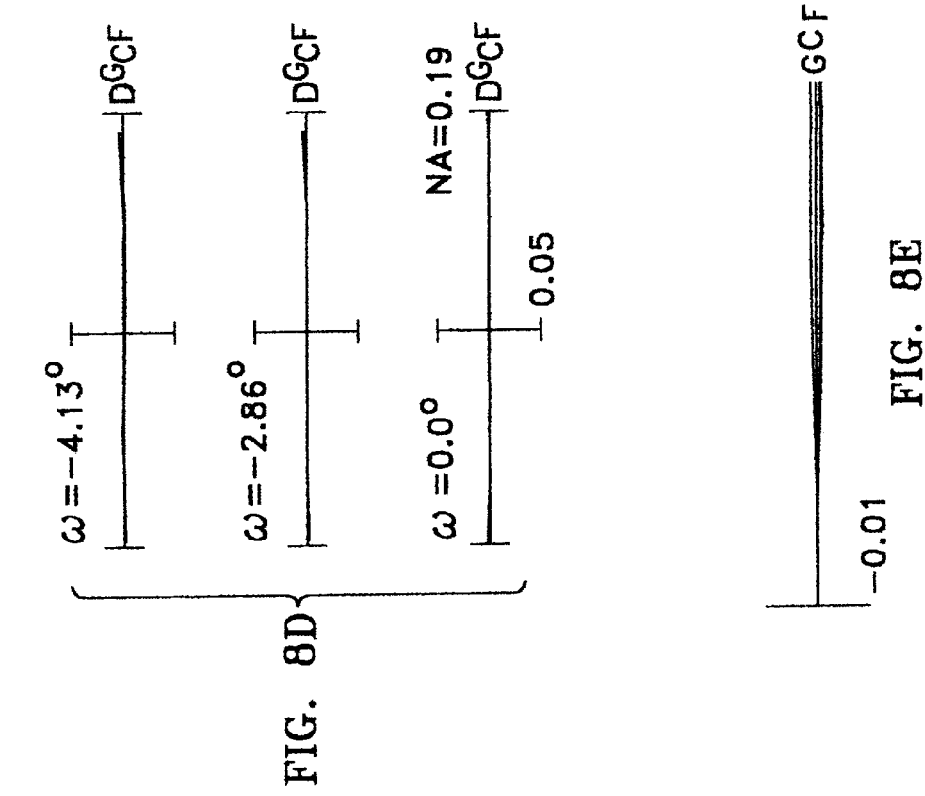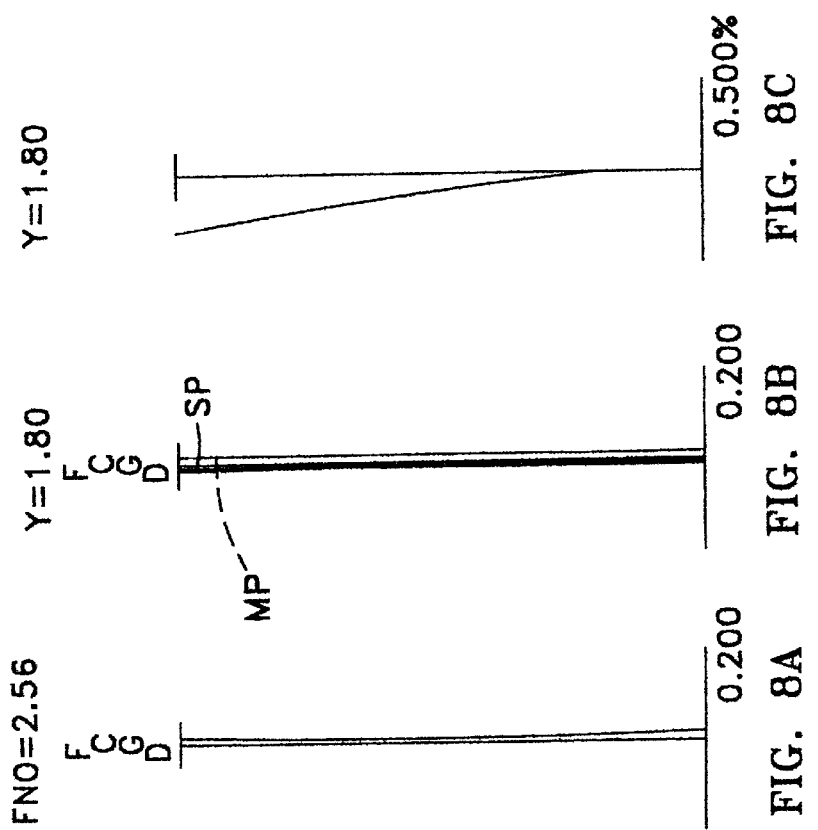

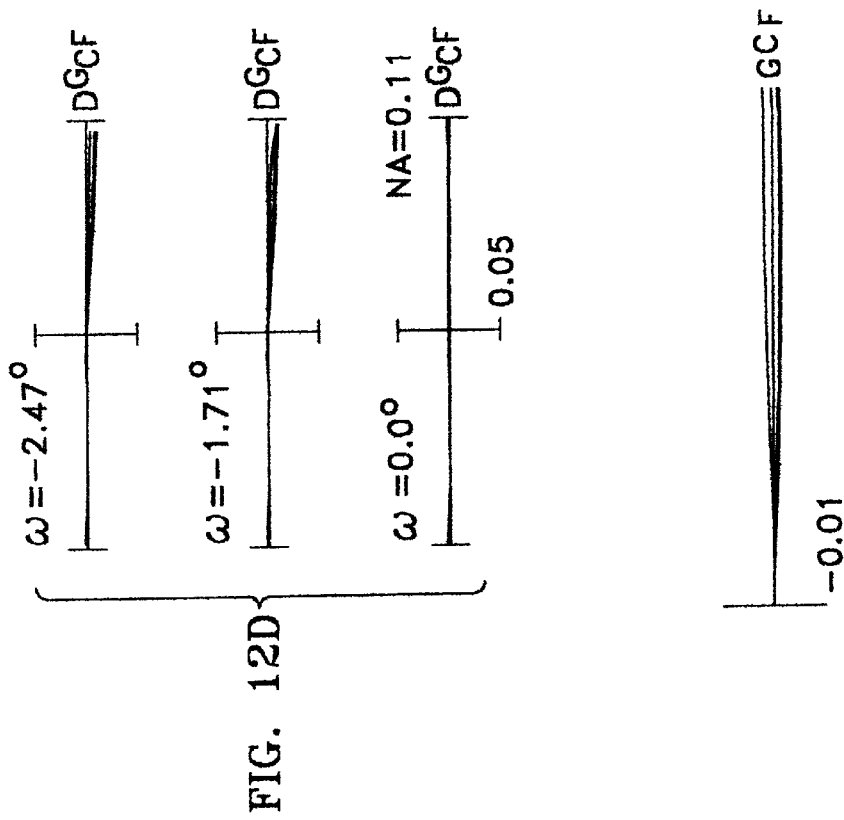
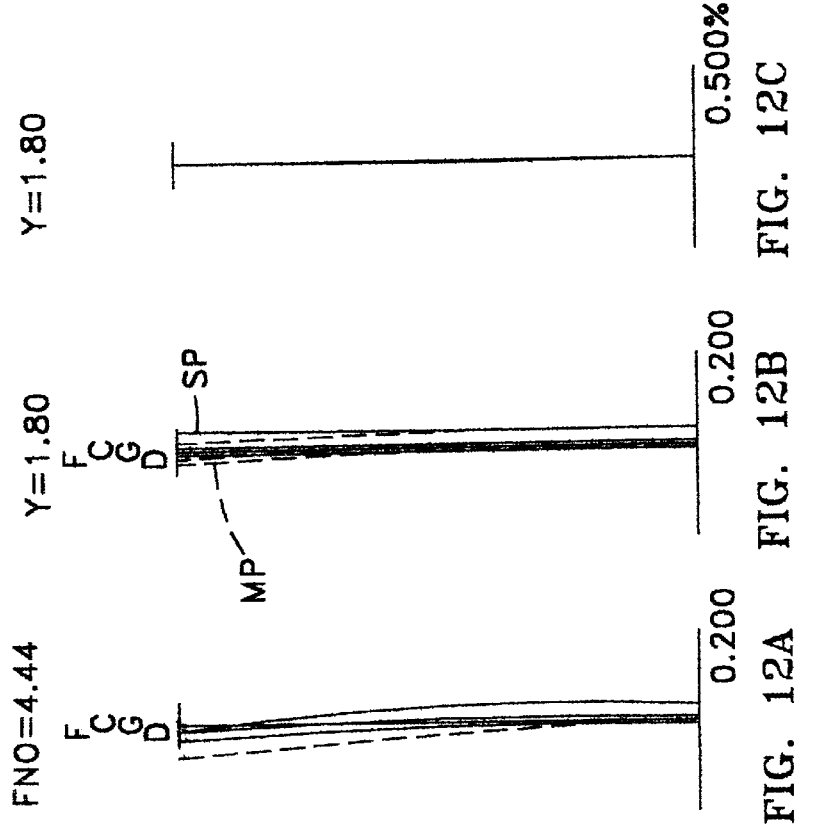
FIG. 12A  FIG. 12B  FIG. 12C  FIG. 12D  FIG. 12E

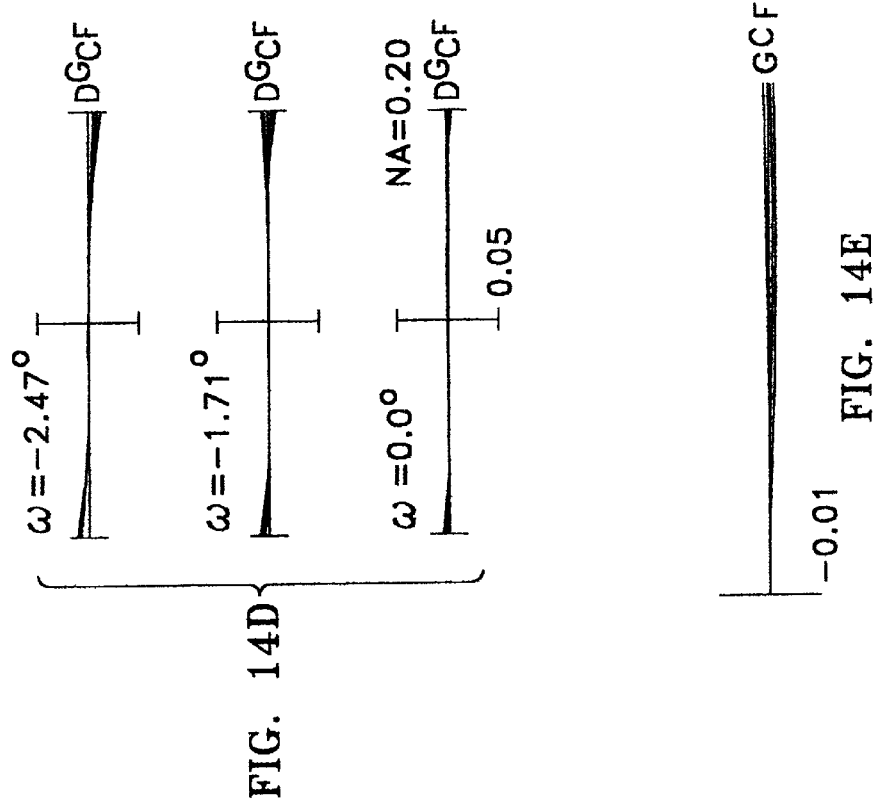
FIG. 14D
FIG. 14E
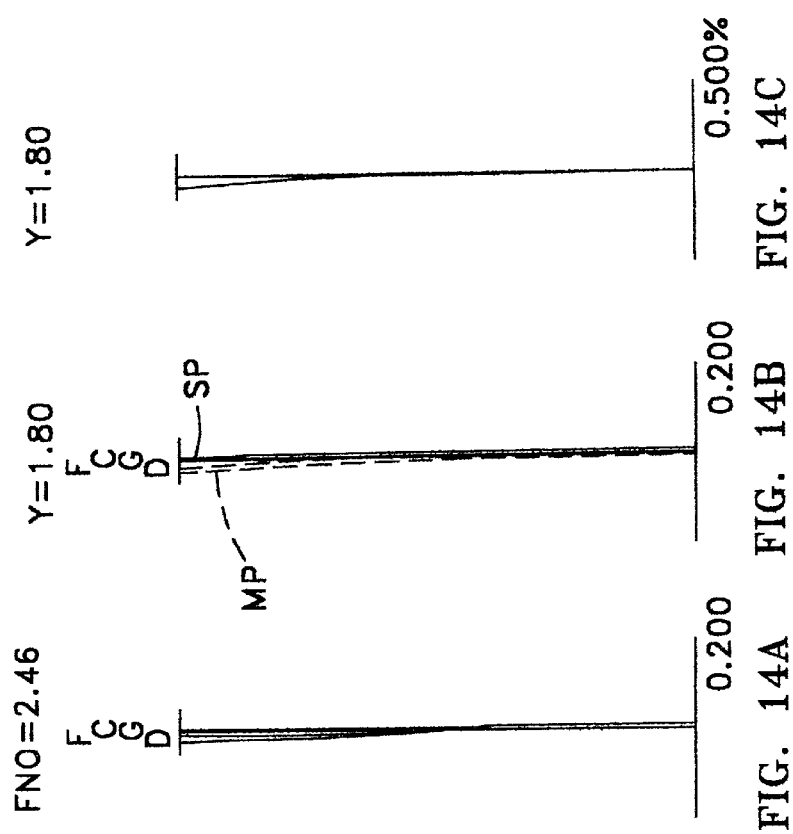
FIG. 14A
FIG. 14B
FIG. 14C

CATADIOPTRIC LENS

FIELD OF THE INVENTION

The present invention relates to a catadioptric lens, and more particularly relates to a catadioptric lens suited for use as an imaging lens for a camera having a compact image pickup device.

BACKGROUND OF THE INVENTION

Catadioptric lenses have frequently been used in the past as long focal length lenses, particularly as super-telephoto lenses, for 35 mm format cameras. This is because long focal length dioptric lenses tend to be long in size. By adopting a catadioptric lens design, the overall lens length can be decreased while still providing a long focal length and controlling chromatic aberration (particularly secondary spectrum).

A conventional catadioptric photographic lens for 35 mm format film comprises, in order from the incoming direction of the light, an incident surface, a main mirror and a secondary mirror arranged in a manner that makes the lens compact. A convex incident surface is generally employed, a concave mirror is used as the main mirror, and a convex mirror is used as the secondary mirror. Accordingly, the power arrangement thereof is positive, positive, negative. In addition, an air lens is generally interposed in the optical path between the main mirror and the secondary mirror.

CCDs (charge-coupled devices) are often used as image pickup devices in digital cameras in combination with a conventional dioptric imaging lens. Nevertheless, CCDs have also become more compact as digital cameras have become more compact. Digital cameras are presently being developed that use compact CCDs having diagonal lengths of 16.76 mm (⅔ inch), 8.38 mm (⅓ inch), 6.35 mm (¼ inch), 5.08 mm (⅕ inch) and the like. With such compact digital cameras, the imaging lens must also be made sufficiently compact.

Therefore, the use of a catadioptric imaging lens originally developed as a photographic (i.e., imaging) lens for standard 35 mm format film may be considered for use as an imaging lens for use with compact image pickup devices like a CCD. However, applicants are unaware of prior art in which a catadioptric lens is used as an imaging lens in combination with a compact image pickup device, most likely for the difficulties discussed below.

The imaging performance of such a system can be studied from the reduced aberration values obtained by reducing the size of a super-telephoto catadioptric imaging lens for 35 mm format film in accordance with the dimensional ratio of the particular image pickup device to the 35 mm format film. However, simply reducing the size of a conventional super-telephoto catadioptric imaging lens for 35 mm format film and then using the lens in combination with a compact image pickup device is problematic for at least two reasons.

The first reason is that imagewise telecentricity cannot be sufficiently ensured. When using a CCD as an image pickup device, each ray must intersect the plane of the CCD at an angle that is within a certain number of degrees. Accordingly, the principal ray (i.e., the central ray of each ray bundle) requires a minimum fixed degree of telecentricity.

To keep the aperture of the main mirror small, a catadioptric lens for 35 mm format film generally uses a lens having positive power on the incident surface. This has the advantage that the stronger the positive power, the smaller the main mirror. On the other hand, since the incident surface has positive power, the diameter of the light beam extending to each image point widens at the incident surface. This results in an extreme drop in the incident height of the principal ray incident upon the incident surface as the image height increases. Thus, the angle of the imagewise principal ray with respect to the optical axis deviates from 0° as the image height increases, so that imagewise telecentricity cannot be sufficiently ensured over the image field. Accordingly, there is a risk that a sufficiently detailed picture can no longer be obtained by the CCD.

Furthermore, in a catadioptric lens provided with an incident surface, a main mirror and a secondary mirror, the cross-section of the light beam that contributes to imaging of image points is annular or alternatively, horseshoe-shaped, in which a portion of a ring is missing. Accordingly, the principal ray is actually blocked from reaching the image plane.

Imagewise telecentricity is low in a conventional catadioptric imaging lens for 35 mm format film. Consequently, the cross-section of the light beam that images at the maximum image height cannot maintain an annular shape. Thus, vignetting occurs in the upper part of some light beams, and the cross-section of those light beams exhibit a horseshoe shape.

The second reason why simply reducing the size of a super-telephoto catadioptric imaging lens for 35 mm format and using it with a CCD is problematic is that it is difficult to accurately manufacture the individual parts and to accurately assemble the parts. If a photographic catadioptric lens for 35 mm format film is used as an imaging lens for a CCD on the order of say ⅕ inch, the reduction magnification turns out to be approximately 0.084. Accordingly, the resolving power, which represents the required lens performance, is approximately 12X, the inverse of the reduction magnification. Thus, the more compact the image pickup device, the higher the resolving power of the imaging lens, and the greater the need to have a lens with parts made to a high tolerance and assembled with a high degree of accuracy.

Also, in a catadioptric imaging lens for 35 mm format film an air lens is generally interposed in the optical path between the main mirror and the secondary mirror. This makes high alignment precision of the main mirror and the secondary mirror difficult. Thus, an imaging lens used with a compact image pickup device requires a simplified construction is needed so that accurate alignment can be achieved when performing mechanical assembly.

SUMMARY OF THE INVENTION

The present invention relates to a catadioptric lens, and more particularly relates to a catadioptric lens suited for use as an imaging lens for a camera having a compact image pickup device. The present invention has a sufficiently high imagewise telecentricity and can be assembled with high precision.

Accordingly a first aspect of the invention is a catadioptric lens capable of forming an image of an object. The lens comprises along an optical axis, a first lens group having an annular incident surface that is objectwise concave and upon which light from the object is first incident, and a most imagewise lens surface. The lens further includes an annular main mirror arranged imagewise of the first lens group and having an objectwise concave reflective surface that reflects light objectwise. A secondary mirror is located objectwise of the annular main mirror and has an imagewise convex reflective surface that reflects light imagewise. This arrangement provides a glass optical path within the first lens group from the incident surface to the main mirror to the secondary mirror and to the most imagewise lens surface of the first lens group.

A second aspect of the invention is a catadioptric lens as described above, wherein the annular incident surface satisfies the condition:

$$0.5 < |r_a/f| < 1$$

wherein $r_a$ is a radius of curvature of the annular incident surface, and f is an overall focal length of the catadioptric lens.

A third aspect of the invention is a catadioptric lens as described above, further satisfying the condition:

$$|\theta| < 7°$$

wherein $\theta$ is an angle, measured with respect to the optical axis, of a principal ray associated with a maximum image height of the image.

A fourth aspect of the invention is a catadioptric lens as described above, further satisfying the following conditions:

$$-0.4 < (r_a - r_b)/(r_a + r_b) < -0.19$$

$$-0.3 < (r_b - r_c)/(r_b + r_c) < 0.3$$

$$0.2 < A/f < 0.6$$

wherein $r_a$ is a radius of curvature of the annular incident surface, $r_b$ is a radius of curvature of the main mirror, $r_c$ is a radius of curvature of the secondary mirror, A is an axial spacing between the main mirror and the secondary mirror.

A fifth aspect of the invention is a catadioptric lens as described above, further including a second lens group arranged immediately adjacent and imagewise of the most imagewise lens surface of the first lens group.

BRIEF DESCRIPTION OF THE DRAWINGS

FIGS. 4A–4E are aberration plots for spherical aberration, astigmatism, distortion, lateral aberration and traverse chromatic aberration for Working Example 2 of FIG. 3;

FIGS. 6A–6E are aberration plots for spherical aberration, astigmatism, distortion, lateral aberration and traverse chromatic aberration for Working Example 3 of FIG. 5;

FIGS. 8A–8E are aberration plots for spherical aberration, astigmatism, distortion, lateral aberration and traverse chromatic aberration for Working Example 4 of FIG. 7;

FIGS. 12A–12E are aberration plots for spherical aberration, astigmatism, distortion, lateral aberration and traverse chromatic aberration for Working Example 6 of FIG. 11;

FIGS. 14A–14E are aberration plots for spherical aberration, astigmatism, distortion, lateral aberration and traverse chromatic aberration for Working Example 7 of FIG. 13.

DETAILED DESCRIPTION OF THE INVENTION

The present invention relates to a catadioptric lens, and more particularly relates to a catadioptric lens suited for use as an imaging lens for a camera having a compact image pickup device.

Figure 1:
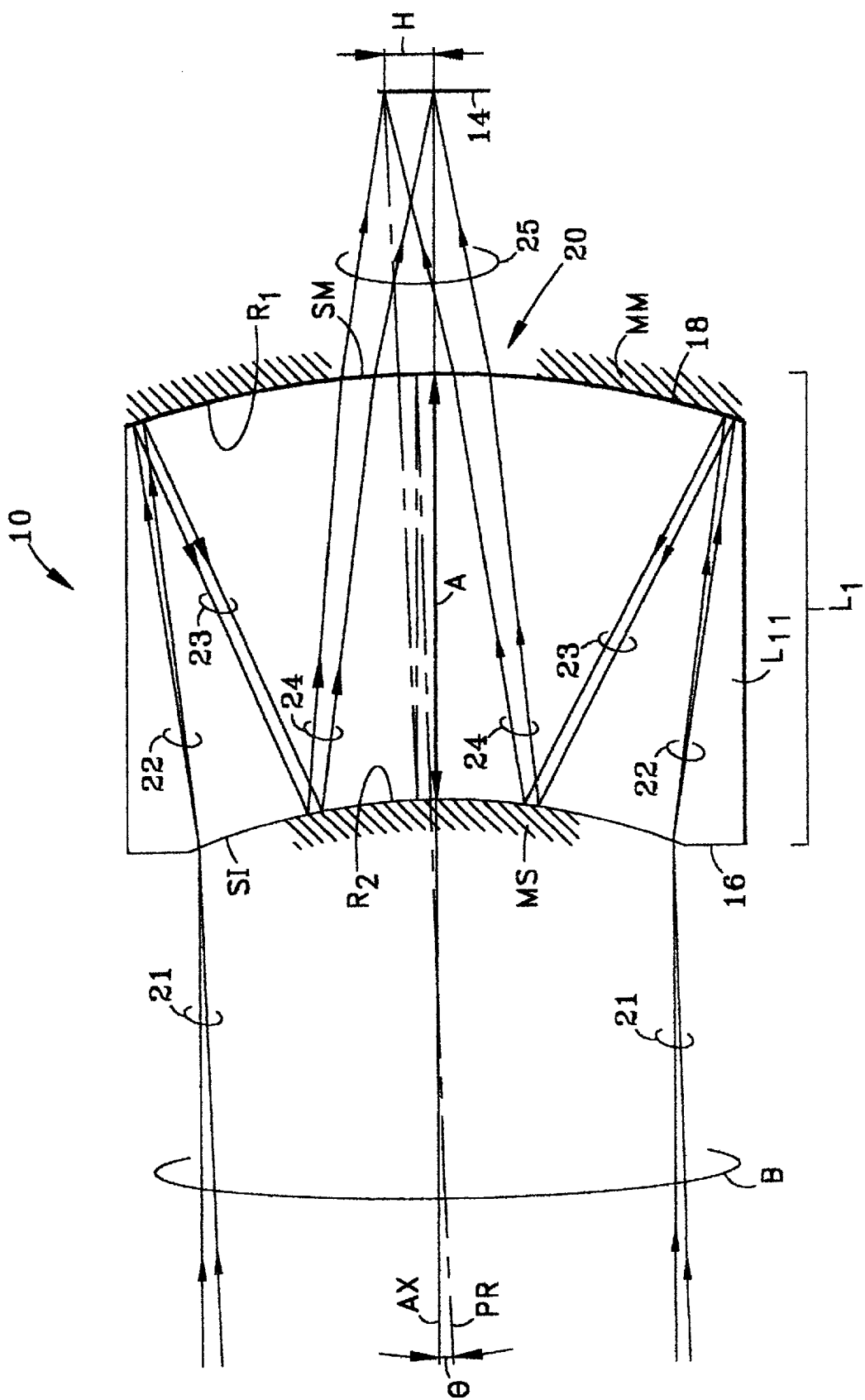
FIG. 1 is a cross-sectional optical diagram of Working Example 1 of the catadioptric lens of the present invention.
Figure 2:
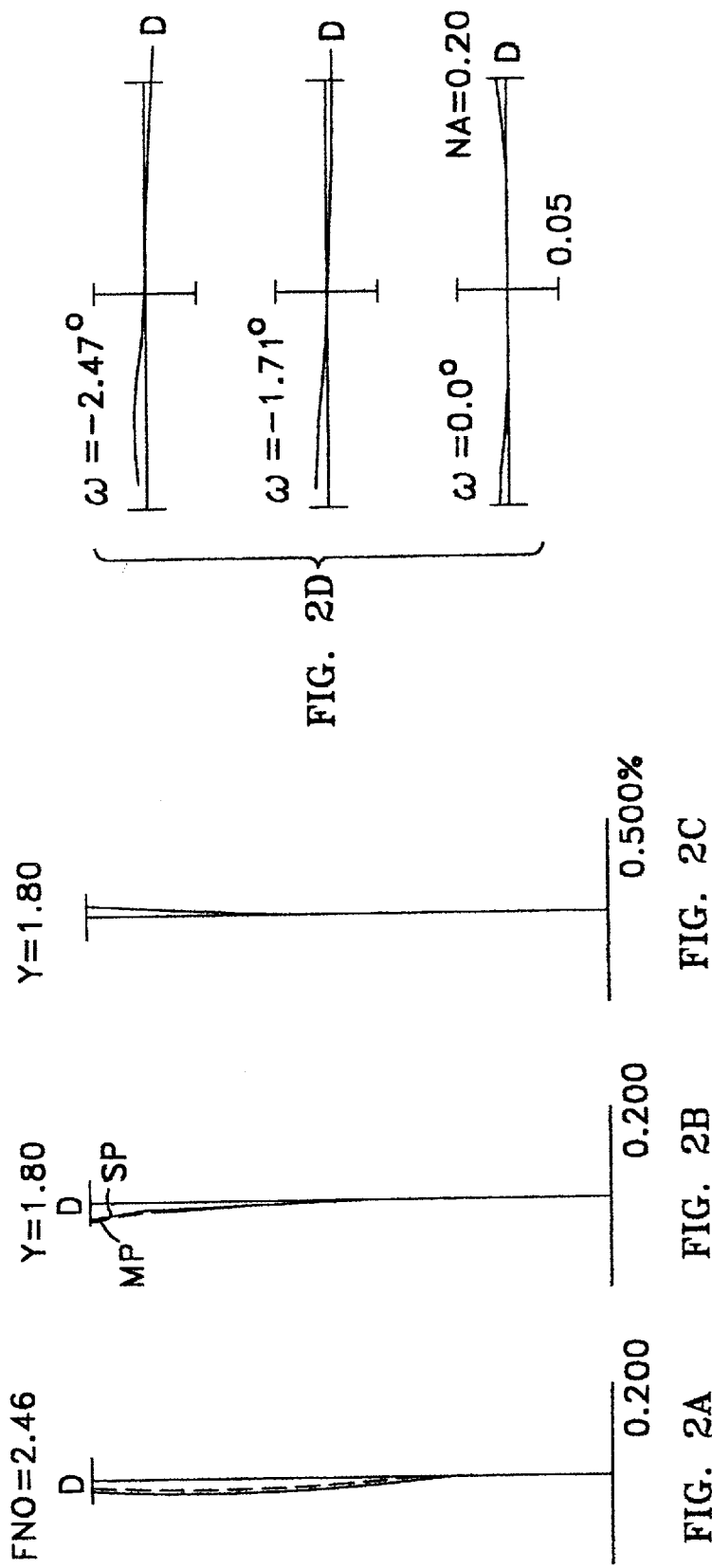
FIGS. 2A–2D are aberration plots for spherical aberration, astigmatism, distortion and lateral aberration for Working Example 1 of FIG. 1.

With reference to FIG. 1, the catadioptric lens of the present invention is now described with reference to a catadioptric lens 10 representing a first Working Example (Working Example 1). Catadioptric lens 10 comprises in order along an optical axis AX in the direction of travel of light beam B from an object (not shown) to an image plane 14 (i.e., objectwise to imagewise), a first lens group lens $L_1$ having first and second surfaces 16 and 18 and a single lens $L_1$. First surface 16 includes an annular incident surface SI upon which light beam B is first incident. An annular main mirror MM with an aperture 20 is located on second surface 18 and has a concave reflective surface R1 which faces objectwise. A secondary mirror MS is located on first surface 16 and has a convex reflective surface R2 facing imagewise.

Thus, in catadioptric lens 10, light beam B first travels objectwise to imagewise and light rays 21 associated therewith pass through annular incident surface SI forming light rays 22. The latter travel within first lens group $L_1$ toward reflective surface R1. Light rays 22 convergently reflect from reflective surface R1, thereby forming light rays 23 which travel objectwise toward reflective surface R2. Light rays 23 reflect from reflective surface R2 forming light rays 24 which travel imagewise and pass through surface SM and aperture 20. Light rays 24 are refracted at surface SM thereby forming light rays 25 which converge on image plane 14, thereby forming an image on image plane 14 having a maximum image height H. For purposes of simplicity, the present specification calls the ray that comprises the center-of-gravity position of each ray the principal ray, even though it is actually blocked.

In the present invention, since annular incident surface SI has a negative power, the diameter of light beam B extending to each image point narrows at the annular surface. Accordingly, the incident height of a principal ray PR incident annular incident surface SI does not drop very much even if the image height H increases. As a result, the angle $\theta$ of principal ray PR measured with respect to optical axis AX does not deviate much from 0° even if the image height increases. This ensures imagewise telecentricity.

In addition, in the present invention, the optical path extending from annular incident surface SI to main mirror MM to secondary mirror MS and to surface SM is a glass optical path within first lens group $L_1$. This allows catadioptric lens 10 of the present invention to be manufactured with high assembly precision, since the lens is simplified through mechanical integration.

It is preferable that the catadioptric lens of the present invention satisfy a number of preferred design conditions, described below.

The first preferred condition pertains to the negative power of annular incident surface SI, and is given by:

$$0.5 < |r_a/f| < 1 \tag{1}$$

wherein $r_a$ is the radius of curvature of annular incident surface SI, and f is the focal length of the entire catadioptric lens.

If $|r_a/f|$ exceeds the upper limit in condition (1), imagewise telecentricity can no longer be sufficiently ensured. In addition, coma, particularly coma on the lower side, worsens. Conversely, if $|r_a/f|$ falls below the lower limit in condition (1), excessive chromatic aberration is generated by annular incident surface SI.

The second design condition pertains to the degree of imagewise telecentricity and is given by:

$$|\theta| < 7° \tag{2}$$

wherein θ is the angle of principal ray PR, as measured with respect to optical axis AX, that forms the maximum image height H.

If $|\theta|$ exceeds the upper limit in condition (2), there is a risk that a sufficiently detailed picture can no longer be obtained if a CCD is used as the image pickup device.

In addition, as another expression of the degree of imagewise telecentricity, it is preferable that the cross-section of the light beam that forms each image point be annular, even at maximum image height H.

In a preferred embodiment of the present invention, first lens group $L_1$ has at least one cemented surface (see, e.g., FIG. 3 and catadioptric lens 30, discussed below). This construction enables the correction of chromatic aberration generated by concave annular incident surface SI.

It is also preferable that annular incident surface SI be such that its central (i.e., axial) portion be formed so that it shares the same curved surface with secondary mirror MS. Alternatively, with reference to FIG. 3 and catadioptric lens 30 for example, it is preferable that this central portion be formed so that it shares the same curved surface with one cemented surface (e.g., cemented surface C1) when at least one cemented surface is provided in the optical path extending from main mirror MM to secondary mirror MS (i.e., within first lens group $L_1$). This configuration simplifies the construction of the catadioptric lens of the present invention.

Figure 3:
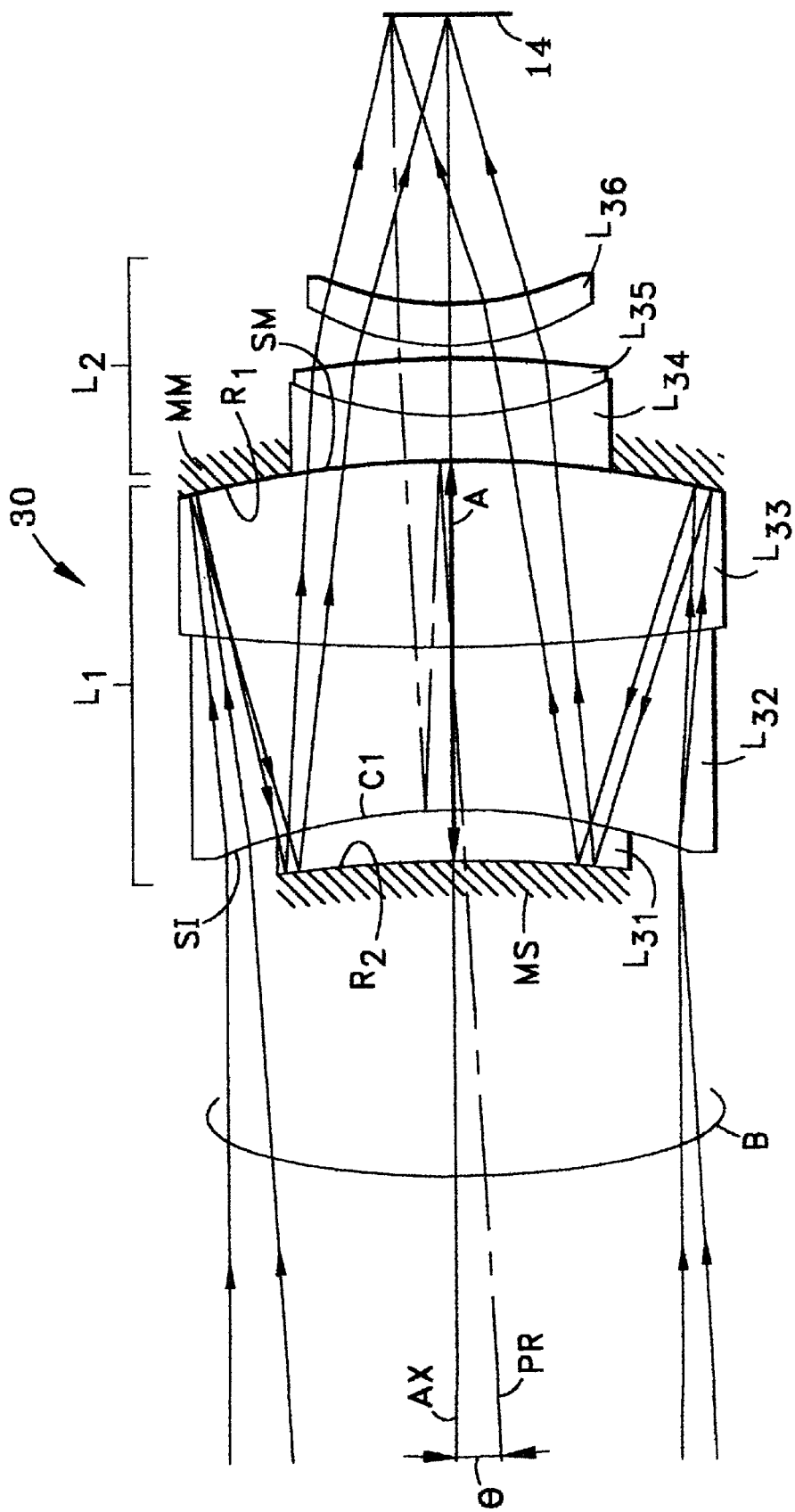
FIG. 3 is a cross-sectional optical diagram of Working Example 2 of the catadioptric lens of the present invention.

With continuing reference to FIG. 3, if annular incident surface SI and cemented surface C1 are the same surface, then this surface is objectwise concave. Therefore, cemented surface C1 is also objectwise concave. On the other hand, since secondary mirror MS is also objectwise concave, lens L31 that provides the optical path between reflective surface R2 and cemented surface C1 inevitably becomes a meniscus lens having an objectwise concave surface. It is preferable that this meniscus lens have positive refractive power.

With reference again to FIG. 1, it is preferable in the present invention that the central portion of annular main mirror MM be formed as a lens surface SM that shares a curved surface with the main mirror, and that the optical path extending from secondary mirror MS to lens surface SM be provided by a single lens group, such as first lens group $L_1$. This configuration simplifies the construction of the catadioptric lens. First lens group $L_1$ may compromise a single lens element (e.g., lens element $L_{11}$) or a plurality of lens elements (e.g., $L_{31}$–$L_{33}$ of catadioptric lens 30 of FIG. 3).

With reference again to FIG. 3, in another preferred embodiment of the catadioptric lens of the present invention, catadioptric lens 30 includes a second lens group L2 arranged imagewise of lens surface SM. Examples of this preferred embodiment are discussed further below.

It is also preferable that the present invention satisfy the following preferred conditions:

$$-0.4 < (r_a - r_b)/(r_a + r_b) < -0.19 \tag{3}$$

$$-0.3 < (r_b - r_c)/(r_b + r_c) < 0.3 \tag{4}$$

$$0.2 < A/f < 0.6 \tag{5}$$

wherein $r_a$ is the radius of curvature of annular incident surface Si, $r_b$ is the radius of curvature of main mirror MM, $r_c$ is the radius of curvature of secondary mirror MS, A is the axial spacing between main mirror MM and secondary mirror MS (see FIG. 1), and f is the overall focal length of the catadioptric lens.

If $(r_a - r_b)/(r_a + r_b)$ falls below the lower limit in condition (3), or if $(r_b - r_c)/(r_b + r_c)$ exceeds the upper limit in condition (4), light ray 22 extending from annular incident surface SI to main mirror MM and light rays 23 extending from main mirror MM to secondary mirror MS can no longer be sufficiently separated. Therefore, the annular width of the light beam that images annularly narrows, and a sufficient quantity of light can no longer be obtained in image plane 14. Accordingly, to sufficiently separate light rays 22 and 23, and to widen the width of the annulus, it is necessary to lengthen axial spacing A. However, if axial spacing A is lengthened, a compact catadioptric lens can no longer be achieved. In addition, if A/f exceeds the upper limit in condition (5), a compact catadioptric lens can no longer be achieved.

Conversely, if $(r_a - r_b)/(r_a + r_b)$ exceeds the upper limit in condition (3) or if $(r_b - r_c)/(r_b + r_c)$ falls below the lower limit in condition (4), the separation angle between light rays 22 and 23 becomes excessively large. In addition, axial spacing A between main mirror MM and secondary mirror MS narrows excessively. Thus, a realistic design becomes impossible to obtain. In addition, if A/f falls below the lower limit in condition (5), a realistic design becomes impossible to obtain.

In an embodiment of the present invention, the catadioptric lens of the present invention may be combined with an eyepiece lens incorporated into the rear thereof so as to constitute an afocal optical system. A relay lens system may also be combined therewith.

WORKING EXAMPLES

Catadioptric lens 10 of FIG. 1 represents Working Example 1 of the present invention. Catadioptric lens 10 has focal length f of 41.8 mm, and first lens group $L_1$ comprises along optical axis AX a single meniscus lens $L_{11}$ having an objectwise concave surface. In this Working Example, the peripheral part of the objectwise lens surface of lens $L_{11}$ constitutes annular incident surface SI. The peripheral part of the imagewise lens surface of lens $L_{11}$ is coated with a reflective material and constitutes reflective surface R1 of annular main mirror MM. The central part of the objectwise lens surface 16 is coated with a reflective material and constitutes reflective surface $R_2$ of secondary mirror MS. Furthermore, the dashed line in FIG. 1 (and also FIGS. 3, 5, 7, 9, 11 and 13) indicates principal ray PR corresponding to maximum image height H, which does not actually contribute to image formation.

With reference now to FIG. 3, catadioptric lens 30 represents Working Example 2 of the present invention. Catadioptric lens 30 has focal length f of 25.08 mm, and comprises along optical axis AX, a first lens group $L_1$ comprising a meniscus lens $L_{31}$ having an objectwise concave surface, a biconcave lens $L_{32}$ cemented to lens $L_{31}$, and a biconvex lens $L_{33}$ cemented to lens $L_{32}$. Catadioptric lens 30 further includes a second lens group $L_2$ comprising a biconcave lens $L_{34}$ cemented to lens $L_{33}$, a biconvex lens $L_{35}$ cemented to lens $L_{34}$, and a meniscus lens $L_{36}$ axially spaced apart from lens $L_{35}$ by an air space and having an imagewise concave surface. In this Working Example, the peripheral part of the objectwise lens surface of lens $L_{32}$ constitutes annular incident surface SI, the peripheral part of the imagewise lens surface of lens $L_{33}$ constitutes annular main mirror MM, and the objectwise lens surface of lens $L_{31}$ constitutes secondary mirror MS.

Figure 5:
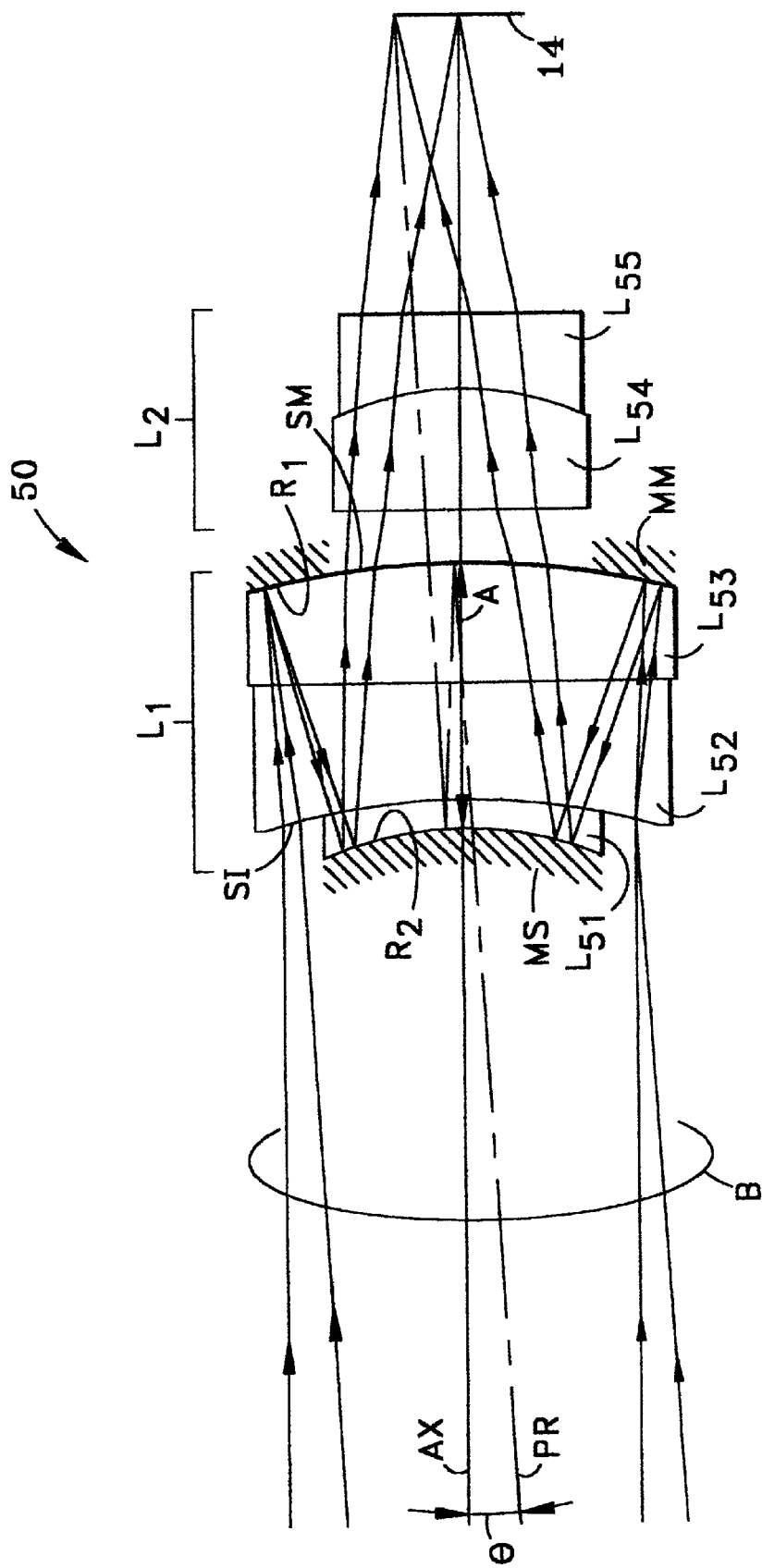
FIG. 5 is a cross-sectional optical diagram of Working Example 3 of the catadioptric lens of the present invention.

With reference now to FIG. 5, catadioptric lens 50 represents Working Example 3 of the present invention. Catadioptric lens 50 has focal length f of 25.08 mm, and comprises along optical axis AX a first lens group $L_1$ comprising a meniscus lens $L_{51}$ having an objectwise concave surface, a negative lens $L_{52}$ cemented to lens $L_{51}$ and a positive lens $L_{53}$ cemented to lens $L_{52}$. Catadioptric lens 50 further includes a second lens group $L_2$ comprising a positive lens $L_{54}$ spaced apart from lens $L_{53}$ by an air space and having an imagewise convex surface, and a negative lens $L_{55}$ cemented to lens $L_{54}$. In this Working Example, the peripheral part of the objectwise lens surface of lens $L_{52}$ constitutes annular incident surface SI, the peripheral part of the imagewise lens surface of lens $L_{53}$ constitutes annular main mirror MM, and the objectwise lens surface of lens $L_5$, constitutes secondary mirror MS.

Figure 7:
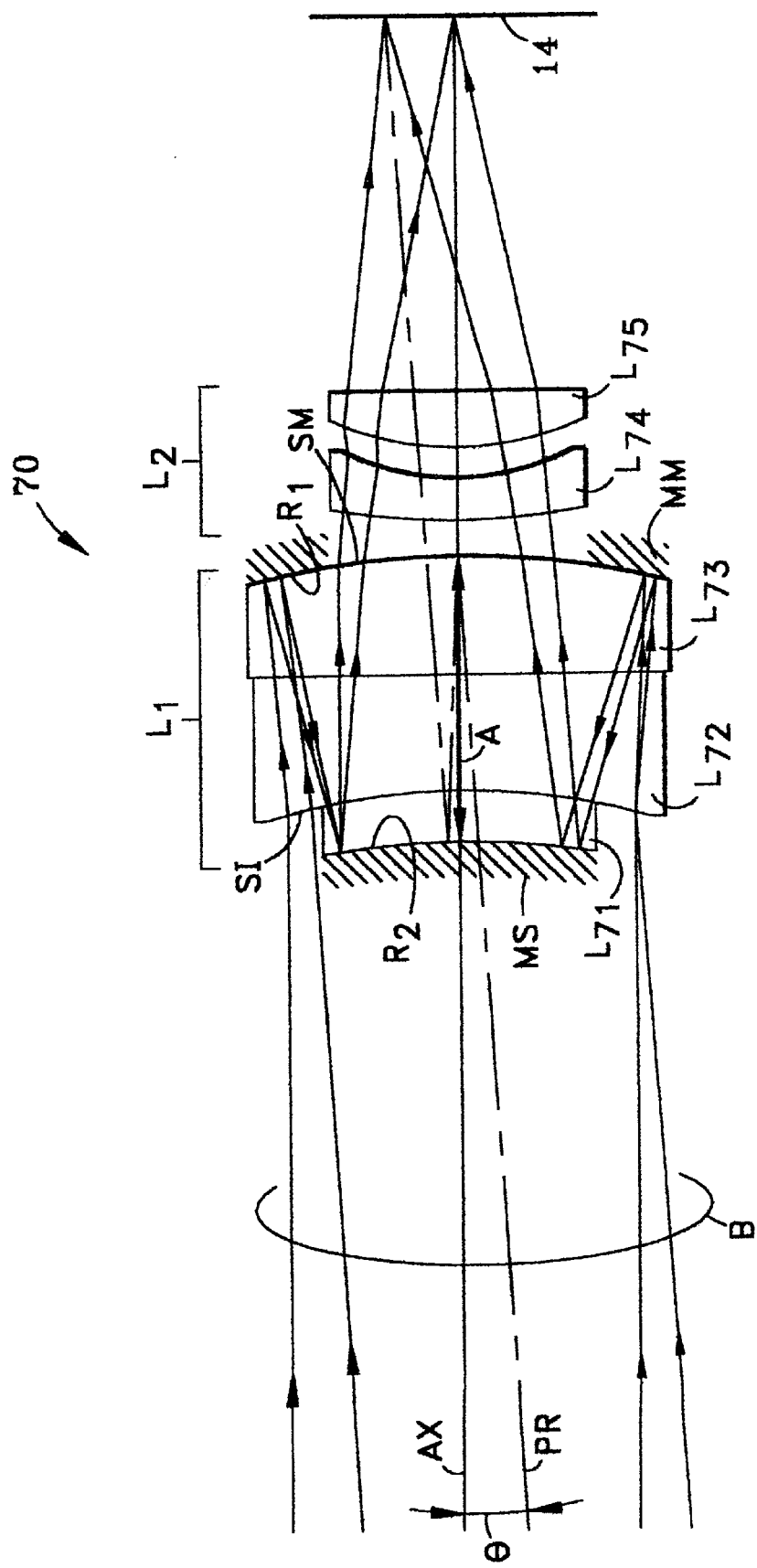
FIG. 7 is a cross-sectional optical diagram of Working Example 4 of the catadioptric lens of the present invention.

With reference now to FIG. 7, catadioptric lens 70 represents Working Example 4 of the present invention. Catadioptric lens 70 has focal length f of 25.08 mm, and comprises along optical axis AX a first lens group L, comprising a meniscus lens $L_{71}$ having an objectwise concave surface, a negative lens $L_{72}$ cemented to lens $L_{71}$, and a positive lens $L_{73}$ cemented to lens $L_{72}$. Catadioptric lens 70 further includes a second lens group $L_2$ comprising a meniscus lens $L_{74}$ spaced apart by an air space and having an imagewise concave surface, and a positive lens $L_{75}$ spaced apart by an air space. In this Working Example, the peripheral part of the objectwise lens surface of lens $L_{72}$ constitutes annular incident surface SI, the peripheral part of the imagewise lens surface of lens $L_{73}$ constitutes annular main mirror MM, and the objectwise lens surface of lens $L_7$ constitutes secondary mirror MS.

Figure 9:
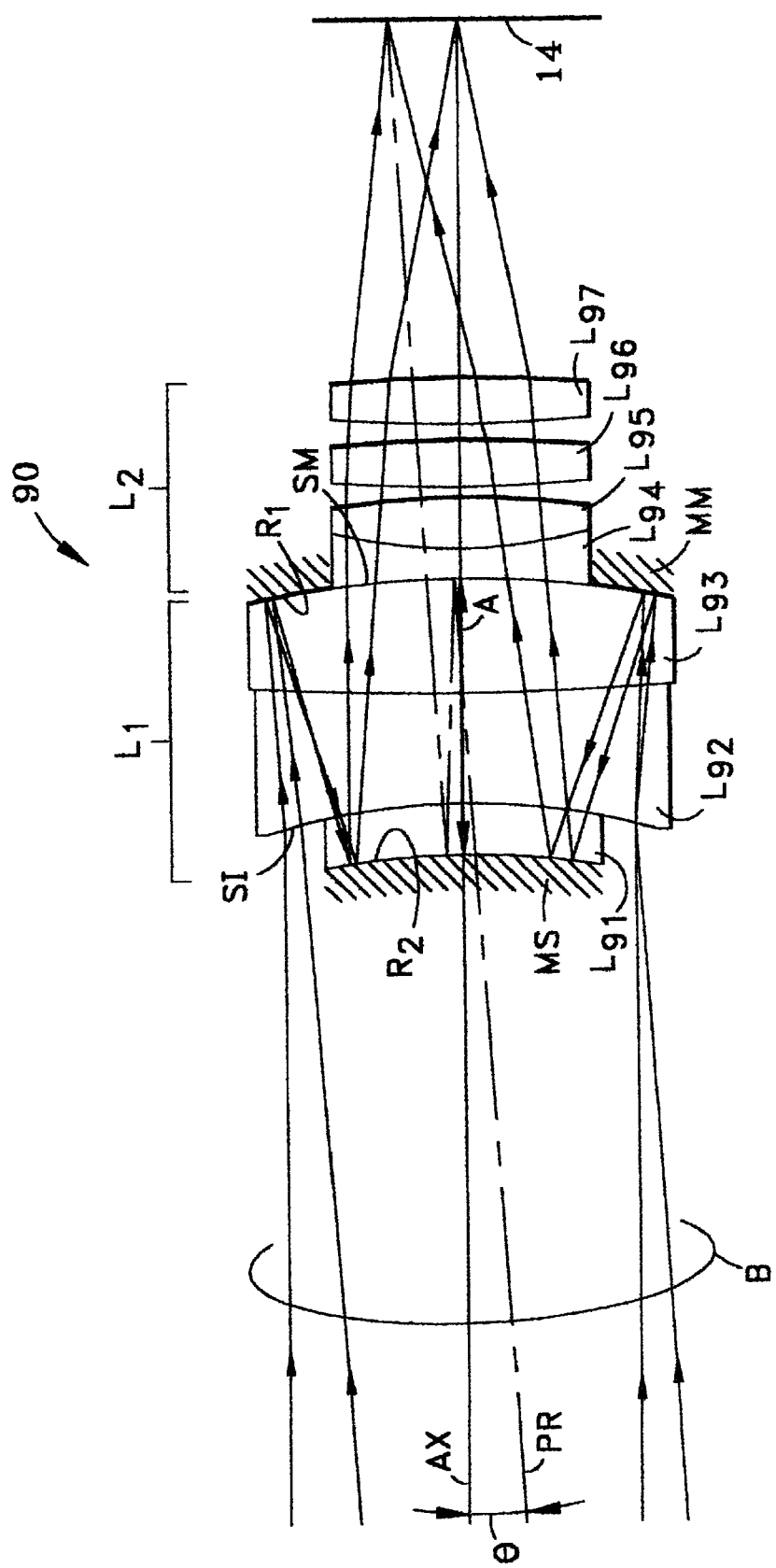
FIG. 9 is a cross-sectional optical diagram of Working Example 5 of the catadioptric lens of the present invention.
Figure 10:
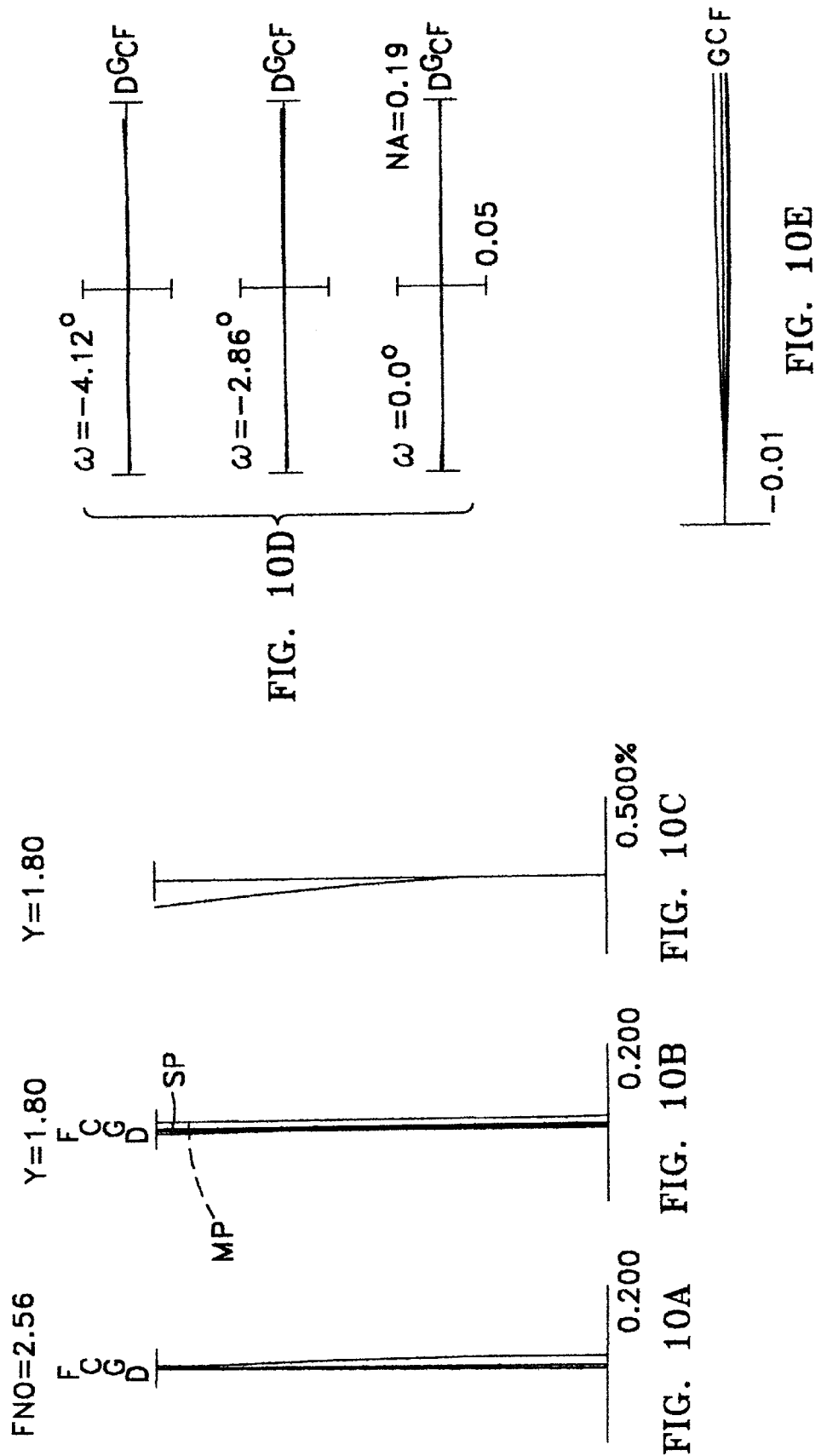
FIGS. 10A–10E are aberration plots for spherical aberration, astigmatism, distortion, lateral aberration and traverse chromatic aberration for Working Example 5 of FIG. 9.

With reference now to FIG. 9, catadioptric lens 90 represents Working Example 5 of the present invention. Catadioptric lens 90 has focal length f of 25.08 mm, and comprises along optical axis AX a first lens group $L_1$ comprising a meniscus lens $L_{91}$ having an objectwise concave surface, a biconcave lens $L_{92}$ cemented to lens $L_{91}$, and a biconvex lens $L_{93}$ cemented to lens $L_{92}$. Catadioptric lens 90 further includes a second lens group $L_2$ comprising a biconcave lens $L_{94}$ cemented to lens $L_{93}$, a biconvex lens $L_{95}$ cemented to lens $L_{94}$, and two positive lenses $L_{96}$, $L_{97}$ spaced apart by an air space. In this Working Example, the peripheral part of the objectwise lens surface of lens $L_{92}$ constitutes annular incident surface SI, the peripheral part of the imagewise lens surface of lens $L_{93}$ constitutes annular main mirror MM, and the objectwise lens surface of lens $L_9$, constitutes secondary mirror MS.

Figure 11:
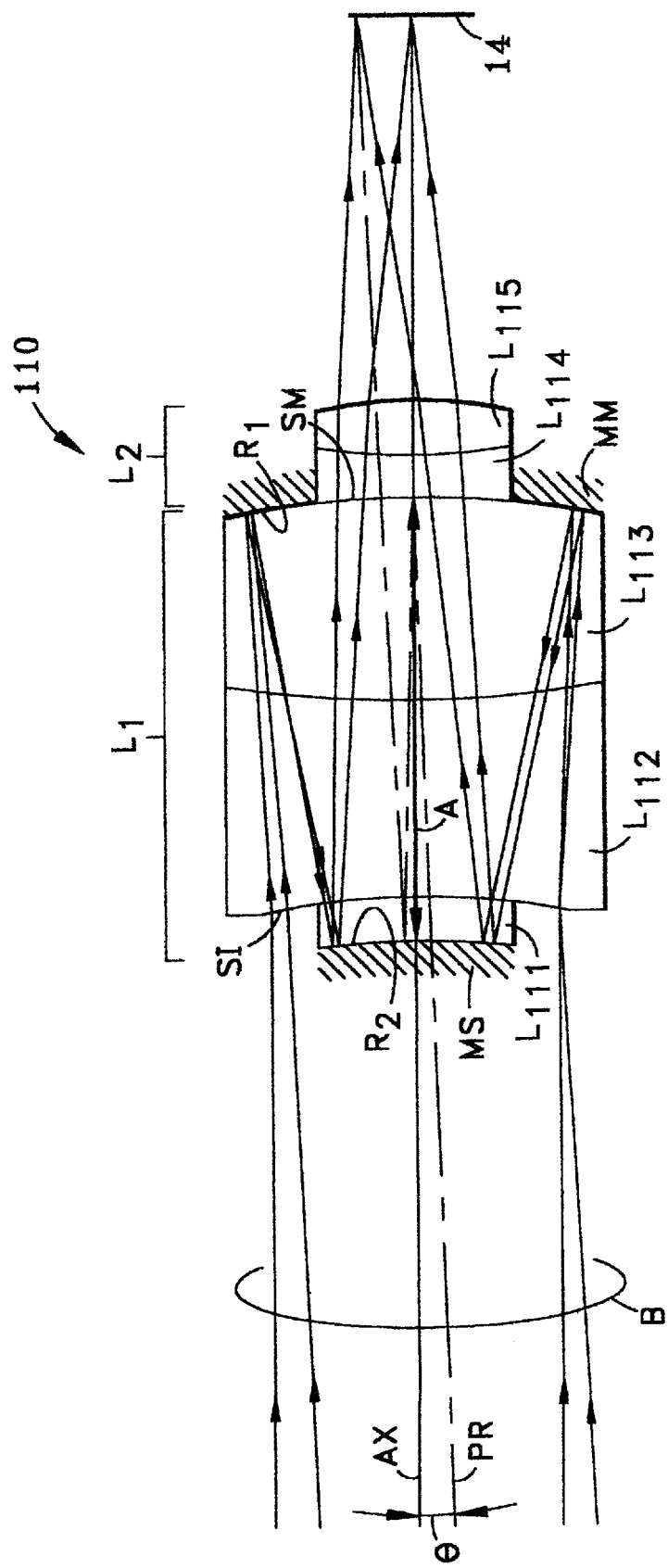
FIG. 11 is a cross-sectional optical diagram of Working Example 6 of the catadioptric lens of the present invention.

With reference now to FIG. 11, catadioptric lens 110 represents Working Example 6 of the present invention. Catadioptric lens 110 has focal length f of 41.8 mm, and comprises along optical axis AX a first lens group $L_1$ comprising a meniscus lens $L_{111}$ having an objectwise concave surface, a biconcave lens $L_{112}$ cemented to lens $L_{111}$, and a biconvex lens $L_{113}$ cemented to lens $L_{112}$. Catadioptric lens 110 further includes a second lens group $L_2$ comprising a biconcave lens $L_{114}$ cemented to lens $L_{113}$, and a biconvex lens $L_{115}$ cemented to lens $L_{114}$. In this Working Example, the peripheral part of the objectwise lens surface of lens $L_{112}$ constitutes annular incident surface Si, the peripheral part of the imagewise lens surface of lens $L_{113}$ constitutes annular main mirror MM, and the objectwise lens surface of lens $L_{111}$ constitutes secondary mirror MS.

Figure 13:
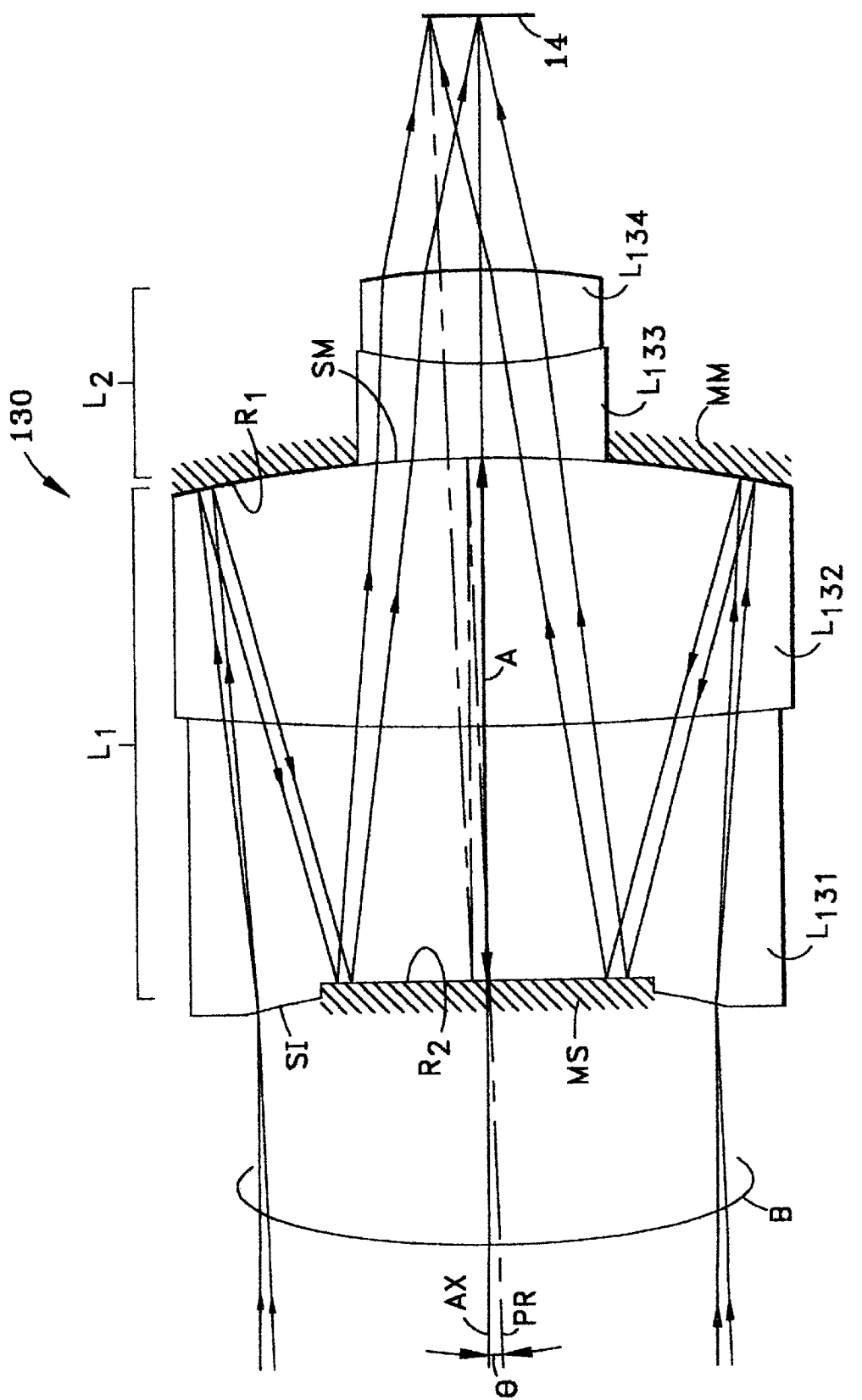
FIG. 13 is a cross-sectional optical diagram of Working Example 7 of the catadioptric lens of the present invention.

With reference now to FIG. 13, catadioptric lens 130 represents Working Example 7 of the present invention. Catadioptric lens 130 has focal length f of 41.8 mm, and comprises along optical axis AX a first lens group $L_1$ comprising a lens $L_{131}$, and a biconvex lens $L_{132}$ cemented to lens $L_{131}$. Catadioptric lens 110 further includes a second lens group $L_2$ comprising a biconcave lens $L_{133}$ cemented to lens $L_{132}$, and a biconvex lens $L_{134}$ cemented to lens $L_{133}$. In this Working Example, the peripheral part of the objectwise lens surface of lens $L_{131}$ constitutes annular incident surface SI, the peripheral part of the imagewise lens surface of lens $L_{132}$ constitutes annular main mirror MM, the central part of the objectwise lens surface of lens $L_{131}$ constitutes secondary mirror MM. Also, incident surface SI and secondary mirror MS share the same curved surface.

Tables 1–7 below list the specification values for Working Examples 1–7, respectively. In each table, the first column "S" indicates the number of each optical surface in order from the object side, the second column "r" indicates the radius of curvature of each optical surface, the third column "d" indicates the axial distance from each optical surface to the next optical surface (or image plane), the fourth column "$n_d$" indicates the refractive index with respect to the d-line (blank indicates air), the fifth column "$V_d$" indicates the d-line Abbe number and the sixth column "Element" indicates the reference symbol of each lens element or surface.

Working Example 1 utilizes only the d-line wavelength. Accordingly, the Abbe number is not listed in Table 1.

Also, in the Tables, the numerical sign for d (third column) and for $n_d$ (fourth column) reverses for every reflection. Each Table also shows the values for design conditions (1) to (5).

In the aberration plots of FIGS. 2, 4, 6, 8, 10, 12 and 14, FNO is the F-number, Y is the image height, ω is the half field-angle, NA is the imagewise numerical aperture and D is the d-line. In the spherical aberration plots (FIGS. 2A, 4A, 6A, 8A, 10A, 12A and 14A), the dotted line indicates the amount of deviation from the sine condition. In the astigmatism plots (FIGS. 2B 4B, 6B, 8B, 10B, 12B and 14B), dotted line MP represents the meridional image plane and solid line SP represents the sagittal image plane.

TABLE 1

DESIGN SPECIFICATIONS FOR WORKING EXAMPLE 1

| S | r | d | $n_d$ | Element |
|---|---|---|---|---|
| 1 | −23.81093 | 15.08675 | 1.51680 | $L_1$, S |
| 2 | −37.21891 | −15.08675 | −1.51680 | $L_1$, $R_1$ |
| 3 | −23.81093 | 15.08675 | 1.51680 | $L_1$, $R_2$ |
| 4 | −37.21891 | 10.09192 | | |

DESIGN CONDITIONS (1) $|r_a/f| = 0.570$
(2) $|\theta| = 3.2°$
(3) $(r_a - r_b)/(r_a + r_b) = -0.220$
(4) $(r_b - r_c)/(r_b + r_c) = 0.220$
(5) $A/f = 0.361$

TABLE 2

DESIGN SPECIFICATIONS FOR WORKING EXAMPLE 2

| S | r | d | $n_d$ | $v_d$ | Element |
|---|---|---|---|---|---|
| 1 | −22.30000 | 5.30000 | 1.49782 | 82.5 | $L_{32}$, S |
| 2 | 160.00000 | 5.30000 | 1.51454 | 54.5 | $L_{33}$ |
| 3 | −41.46202 | −5.30000 | −1.51454 | 54.5 | $L_{33}$, $R_1$ |
| 4 | 160.00000 | −5.30000 | −1.49782 | 82.5 | $L_{32}$ |
| 5 | −22.30000 | −1.50000 | −1.51680 | 64.1 | $L_{31}$ |
| 6 | −51.95809 | 1.50000 | 1.51680 | 64.1 | $L_{31}$, $R_2$ |
| 7 | −22.30000 | 5.30000 | 1.49782 | 82.5 | $L_{32}$ |
| 8 | 160.00000 | 5.30000 | 1.51454 | 54.5 | $L_{33}$ |
| 9 | −41.46202 | 1.50000 | 1.69895 | 30.0 | $L_{34}$ |
| 10 | 12.50000 | 1.70000 | 1.6968O | 55.6 | $L_{35}$ |
| 11 | −30.62599 | 0.50000 | | | |
| 12 | 8.70710 | 1.20000 | 1.51680 | 64.1 | $L_{36}$ |
| 13 | 11.26858 | 8.74997 | | | |

DESIGN CONDITIONS (1) $|r_a/f| = 0.889$
(2) $|\theta| = 1.9°$
(3) $(r_a - r_b)/(r_a + r_b) = -0.301$
(4) $(r_b - r_c)/(r_b + r_c) = -0.112$
(5) $A/f = 0.482$

TABLE 3

DESIGN SPECIFICATIONS FOR WORKING EXAMPLE 3

| S | r | d | $n_d$ | $v_d$ | Element |
|---|---|---|---|---|---|
| 1 | −17.10000 | 3.20000 | 1.49782 | 82.5 | $L_{52}$, S |
| 2 | 1000.00000 | 3.20000 | 1.51454 | 54.5 | $L_{53}$ |
| 3 | −26.74915 | −3.20000 | −1.51454 | 54.5 | $L_{53}$, $R_1$ |
| 4 | 1000.00000 | −3.20000 | −1.49782 | 82.5 | $L_{52}$ |
| 5 | −17.10000 | −1.35000 | −1.51680 | 64.1 | $L_{51}$ |
| 6 | −25.64053 | 1.35000 | 1.51680 | 64.1 | $L_{51}$, $R_2$ |
| 7 | −17.10000 | 3.20000 | 1.49782 | 82.5 | $L_{52}$ |
| 8 | 1000.00000 | 3.20000 | 1.51454 | 54.5 | $L_{53}$ |
| 9 | −26.74915 | 1.50000 | | | |
| 10 | 248.74482 | 3.20000 | 1.80411 | 46.5 | $L_{54}$ |
| 11 | −9.90000 | 2.00000 | 1.80518 | 25.3 | $L_{55}$ |
| 12 | −93.29337 | 8.09243 | | | |

DESIGN CONDITIONS (1) $|r_a/f| = 0.682$
(2) $|\theta| = 3.8°$
(3) $(r_a - r_b)/(r_a + r_b) = -0.220$
(4) $(r_b - r_c)/(r_b + r_c) = 0.0212$
(5) $A/f = 0.309$

TABLE 4

DESIGN SPECIFICATIONS FOR WORKING EXAMPLE 4

| S | r | d | $n_d$ | $v_d$ | Element |
|---|---|---|---|---|---|
| 1 | −17.00000 | 3.30000 | 1.49782 | 82.5 | $L_{72}$, S |
| 2 | −1000.00000 | 3.30000 | 1.51454 | 54.5 | $L_{73}$ |
| 3 | −29.37105 | −3.30000 | −1.51454 | 54.5 | $L_{73}$, $R_1$ |
| 4 | −1000.00000 | −3.30000 | −1.49782 | 82.5 | $L_{72}$ |
| 5 | −17.00000 | −1.35000 | −1.51680 | 64.1 | $L_{71}$ |
| 6 | −31.47797 | 1.35000 | 1.51680 | 64.1 | $L_{71}$, $R_2$ |
| 7 | −17.00000 | 3.30000 | 1.49782 | 82.5 | $L_{72}$ |
| 8 | −1000.00000 | 3.30000 | 1.51454 | 54.5 | $L_{73}$ |
| 9 | −29.37105 | 1.00000 | | | |
| 10 | 19.30000 | 1.00000 | 1.80518 | 25.3 | $L_{74}$ |
| 11 | 9.35260 | 0.80000 | | | |

TABLE 4-continued

| 12 | 8.77000 | 1.60000 | 1.51680 | 64.1 | $L_{75}$ |
|---|---|---|---|---|---|
| 13 | 161.08785 | 10.61764 | | | |

DESIGN CONDITIONS (1) $|r_a/f| = 0.677$
(2) $|\theta| = 3.4°$
(3) $(r_a - r_b)/(r_a + r_b) = -0.267$
(4) $(r_b - r_c)/(r_b + r_c) = -0.0346$
(5) $A/f = 0.317$

TABLE 5

DESIGN SPECIFICATIONS FOR WORKING EXAMPLE 5

| S | r | d | $n_d$ | $v_d$ | Element |
|---|---|---|---|---|---|
| 1 | −17.10000 | 3.04000 | 1.49782 | 82.5 | $L_{92}$, S |
| 2 | 80.00000 | 3.04000 | 1.51454 | 54.5 | $L_{93}$ |
| 3 | −25.40210 | −3.04000 | −1.51454 | 54.5 | $L_{93}$, $R_1$ |
| 4 | 80.00000 | −3.04000 | −1.49782 | 82.5 | $L_{92}$ |
| 5 | −17.10000 | −1.33000 | −1.51680 | 64.1 | $L_{91}$ |
| 6 | −23.26681 | 1.33000 | 1.51680 | 64.1 | $L_{91}$, $R_2$ |
| 7 | −17.10000 | 3.04000 | 1.49782 | 82.5 | $L_{92}$ |
| 8 | 80.00000 | 3.04000 | 1.51454 | 54.5 | $L_{93}$ |
| 9 | −25.40210 | 1.20000 | 1.80518 | 25.3 | $L_{94}$ |
| 10 | 20.00000 | 1.20000 | 1.80411 | 46.5 | $L_{95}$ |
| 11 | −124.32407 | 0.50000 | | | |
| 12 | 100.00000 | 1.20000 | 1.76684 | 46.8 | $L_{96}$ |
| 13 | −126.87404 | 0.50000 | | | |
| 14 | 102.38223 | 1.20000 | 1.76684 | 46.8 | $L_{97}$ |
| 15 | −44.80719 | 9.30115 | | | |

DESIGN CONDITIONS (1) $|r_a/f| = 0.0682$
(2) $|\theta| = 3.5°$
(3) $(r_a - r_b)/(r_a + r_b) = -0.195$
(4) $(r_b - r_c)/(r_b + r_c) = -0.0439$
(5) $A/f = 0.295$

TABLE 6

DESIGN SPECIFICATIONS FOR WORKING EXAMPLE 6

| S | r | d | $n_d$ | $v_d$ | Element |
|---|---|---|---|---|---|
| 1 | −23.00000 | 6.20000 | 1.49782 | 82.5 | $L_{112}$, S |
| 2 | 40.00000 | 6.20000 | 1.51680 | 64.1 | $L_{113}$ |
| 3 | −38.81515 | −6.20000 | −1.51680 | 64.1 | $L_{113}$, $R_1$ |
| 4 | 40.00000 | −6.20000 | −1.49782 | 82.5 | $L_{112}$ |
| 5 | −23.00000 | −1.50000 | −1.51680 | 64.1 | $L_{111}$ |
| 6 | −31.18527 | 1.50000 | 1.51680 | 64.1 | $L_{111}$, $R_2$ |
| 7 | −23.00000 | 6.20000 | 1.49782 | 82.5 | $L_{112}$ |
| 8 | 40.00000 | 6.20000 | 1.51680 | 64.1 | $L_{113}$ |
| 9 | −38.81515 | 1.50000 | 1.75520 | 27.6 | $L_{114}$ |
| 10 | 25.00000 | 1.50000 | 1.74443 | 49.5 | $L_{115}$ |
| 11 | −48.71002 | 12.10988 | | | |

DESIGN CONDITIONS (1) $|r_a/f| = 0.550$
(2) $|\theta| = 3.2°$
(3) $(r_a - r_b)/(r_a + r_b) = -0.256$
(4) $(r_b - r_c)/(r_b + r_c) = -0.109$
(5) $A/f = 0.333$

TABLE 7

DESIGN SPECIFICATIONS FOR WORKING EXAMPLE 7

| S | r | d | $n_d$ | $v_d$ | Element |
|---|---|---|---|---|---|
| 1 | −36.70000 | 9.00000 | 1.49782 | 82.5 | $L_{131}$, S |
| 2 | 110.00000 | 9.50000 | 1.50137 | 56.4 | $L_{132}$ |
| 3 | −55.86448 | −9.50000 | −1.50137 | 56.4 | $L_{132}$, $R_1$ |
| 4 | 110.00000 | −9.00000 | −1.49782 | 82.5 | $L_{131}$ |
| 5 | −60.00000 | 9.00000 | 1.49782 | 82.5 | $L_{131}$, $R_2$ |
| 6 | 110.00000 | 9.50000 | 1.50137 | 56.4 | $L_{132}$ |
| 7 | −55.86448 | 3.24000 | 1.75520 | 27.6 | $L_{133}$ |
| 8 | 19.00000 | 3.24000 | 1.74443 | 49.5 | $L_{134}$ |
| 9 | −40.30359 | 9.35846 | | | |

DESIGN CONDITIONS (1) $|r_a/f| = 0.878$
(2) $|\theta| = 1.6°$
(3) $(r_a − r_b)/(r_a + r_b) = −0.207$
(4) $(r_b − r_c)/(r_b + r_c) = −0.0357$
(5) $A/f = 0.443$ FIGS. 2A–2D are plots of spherical aberration, astigmatism, distortion and lateral aberration, respectively, for Working Example 1. From these plots, it can be seen that the catadioptric lens has superior imaging performance at the d-line wavelength.

FIGS. 4, 6, 8, 10, 12 and 14 are plots of spherical aberration, astigmatism, distortion, and lateral aberration and traverse chromatic aberration for Working Examples 2–7, respectively. In the figures, C is the C-line wavelength (656.3 nm), D is the d-line wavelength (587.6), F is the F-line wavelength (486.1 nm) and G is the g-line wavelength (435.8 nm). From these plots, it can be seen that the catadioptric lenses of Working Examples 2–7 have superior imaging performance, including satisfactory correction of chromatic aberration.

As described above, incident annular surface SI of the catadioptric lens of the present invention has a relatively strong concave power. Thus, the incident height of the principal ray incident the incident surface can be increased relative to the prior art. Accordingly, it is possible to increase the imagewise telecentricity to the degree necessary for using a catadioptric imaging lens in combination with a compact image pickup device.

In addition, as described in Working Examples 2–7, by providing a first lens group between main mirror MM and secondary mirror MS and by providing a second lens group (preferably in the form of a doublet lens) imagewise of the first lens group, even the relatively strong chromatic aberration generated at incident annular surface SI is corrected to a high degree. This allows for a high-performance catadioptric lens, as evidenced by the aberration plots for the various Working Examples. Also, by dividing and/or separating two or more lenses in the second lens group, a catadioptric lens having satisfactory imaging performance is obtained across the field-angles ranging from approximately 8.24° to 4.94°.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A catadioptric lens having an overall focal length f and capable of forming an image of an object and comprising, along an optical axis:

1) a first lens group having an annular incident surface that is objectwise concave and upon which light from the object is first incident, and a most imagewise lens surface;

2) an annular main mirror arranged imagewise of said first lens group and having an objectwise concave reflective surface that reflects light objectwise;

3) a secondary mirror located objectwise of said annular main mirror and having an imagewise convex reflective surface that reflects light imagewise; and 4) a glass optical Path within said first lens group from said annular incident surface to said main mirror to said secondary mirror and to said most imagewise lens surface of said first lens group, wherein said annular incident surface satisfies the following condition:

$$0.5 < |r_a/f| < 1$$

where $r_a$ is a radius of curvature of said annular incident surface.

2. A catadioptric lens according to claim 1, satisfying the condition:

$$|\theta| < 7°$$

where $\theta$ is an angle, measured with respect to the optical axis, of a principal ray associated with a maximum image height of the image.

3. A catadioptric lens according to claim 1, satisfying the following conditions:

$$-0.4 < (r_a − r_b)/(r_a + r_b) < −0.19$$

$$-0.3 < (r_b − r_c)/(r_b + r_c) < 0.3$$

$$0.2 < A/f < 0.6$$

where $r_a$ is a radius of curvature of said annular incident surface, $r_b$ is a radius of curvature of said main mirror, $r_c$ is a radius of curvature of said secondary mirror, and A is an axial spacing between said main mirror and said secondary mirror.

4. A catadioptric lens having an overall focal length f and capable of forming an image of an object and comprising, along an optical axis:

1) a first lens group having an annular incident surface that is objectwise concave and upon which light from the object is first incident, and a most imagewise lens surface;

2) an annular main mirror arranged imagewise of said first lens group and having an objectwise concave reflective surface that reflects light objectwise;

3) a secondary mirror located objectwise of said annular main mirror and having an imagewise convex reflective surface that reflects light imagewise; and 4) a glass optical path within said first lens group from said annular incident surface to said main mirror to said secondary mirror and to said most imagewise lens surface of said first lens group, wherein the following condition is satisfied:

$$|\theta| < 7°$$

where $\theta$ is an angle, measured with respect to the optical axis, of a principal ray associated with a maximum image height of the image.

5. A catadioptric lens according to claim 4, wherein each ray that forms said maximum image height is part of an annular light beam.

6. A catadioptric lens according to claim 4, satisfying the following conditions:

$$-0.4<(r_a-r_b)/(r_a+r_b)<-0.19$$
$$-0.3<(r_b-r_c)/(r_b+r_c)<0.3$$
$$0.2<A/f<0.6$$

where $r_a$ is a radius of curvature of said annular incident surface, $r_b$ is a radius of curvature of said main mirror, $r_c$ is a radius of curvature of said secondary mirror, and A is an axial spacing between said main mirror and said secondary mirror.

7. A catadioptric lens having an overall focal length f and capable of forming an image of an object and comprising, along an optical axis:
  1) a first lens group having an annular incident surface that is objectwise concave and upon which light from the object is first incident, and a most imagewise lens surface;
  2) an annular main mirror arranged imagewise of said first lens group and having an objectwise concave reflective surface that reflects light objectwise;
  3) a secondary mirror located objectwise of said annular main mirror and having an imagewise convex reflective surface that reflects light imagewise; and
  4) a glass optical path within said first lens group from said annular incident surface to said main mirror to said secondary mirror and to said most imagewise lens surface of said first lens group,
  wherein said first lens group comprises at least two lens elements and at least one cemented surface and said annular incident surface and said one cemented surface are the same surface.

8. A catadioptric lens according to claim 7, wherein said first lens group includes a lens element with positive refractive power arranged between said secondary mirror and said one cemented surface.

9. A catadioptric lens having an overall focal length f and capable of forming an image of an object and comprising, along an optical axis:
  1) a first lens croup having an annular incident surface that is objectwise concave and upon which light from the object is first incident, and a most imagewise lens surface;
  2) an annular main mirror arranged imagewise of said first lens group and having an objectwise concave reflective surface that reflects light objectwise and a central aperture coincident with said most imagewise lens surface of said first lens group;
  3) a secondary mirror located objectwise of said annular main mirror and having an imagewise convex reflective surface that reflects light imagewise;
  4) a glass optical path within said first lens group from said annular incident surface to said main mirror to said secondary mirror and to said most imagewise lens surface of said first lens group; and
  5) a second lens group arranged immediately adjacent and imagewise of said most imagewise lens surface of said first lens group.

10. A catadioptric lens according to claim 9, wherein said second lens group has a most objectwise lens surface that is cemented to said most imagewise lens surface of said first lens group.

11. A catadioptric lens having an overall focal length f and capable of forming an image of an object and comprising, along an optical axis:
  1) a first lens group having an annular incident surface that is objectwise concave and upon which light from the object is first incident, and a most imagewise lens surface;
  2) an annular main mirror arranged imagewise of said first lens group and having an objectwise concave reflective surface that reflects light objectwise;
  3) a secondary mirror located objectwise of said annular main mirror and having an imagewise convex reflective surface that reflects light imagewise; and
  4) a glass optical path within said first lens group from said annular incident surface to said main mirror to said secondary mirror and to said most imagewise lens surface of said first lens group,
  wherein the following conditions are satisfied:

$$-0.4<(r_a-r_b)/(r_a+r_b)<-0.19$$
$$-0.3<(r_b-r_c)/(r_b+r_c)<0.3$$
$$0.2<A/f<0.6$$

where $r_a$ is a radius of curvature of said annular incident surface, $r_b$ is a radius of curvature of said main mirror, $r_c$ is a radius of curvature of said secondary mirror, and A is an axial spacing between said main mirror and said secondary mirror.

12. A catadioptric lens having an overall focal length f and capable of forming an image of an object and comprising, along an optical axis:
  1) a first lens group having an annular incident surface that is objectwise concave and upon which light from the object is first incident, and a most imagewise lens surface;
  2) an annular main mirror arranged imagewise of said first lens group and having an objectwise concave reflective surface that reflects light objectwise;
  3) a secondary mirror located objectwise of said annular main mirror and having an imagewise convex reflective surface that reflects light imagewise; and
  4) a glass optical path within said first lens group from said annular incident surface to said main mirror to said secondary mirror and to said most imagewise lens surface of said first lens group,
  wherein said first lens group comprises, in order along the optical axis:
    a) a first positive meniscus lens element having an objectwise concave surface;
    b) a first biconcave lens element cemented to said positive meniscus lens element; and
    c) a first biconvex lens element cemented to said first biconcave lens element.

13. A catadioptric lens according to claim 12, further including imagewise of said first lens group, a second lens group comprising, in order along the optical axis:
  a) a second biconcave lens element cemented to said first biconvex lens element;
  b) a second biconvex lens element cemented to said second biconcave lens element; and
  c) a positive meniscus lens element having an objectwise convex surface.

14. A catadioptric lens according to claim 12, further including a second lens group comprising, in order along the optical axis:

a) a second biconcave lens element cemented to said first biconvex lens element; and b) a second biconvex lens element cemented to said second biconcave lens element.

15. A catadioptric lens according to claim 14, further comprising in order along the optical axis:

a) a first positive lens element spaced apart from said second biconvex lens element; and b) a second positive lens element spaced apart from said first positive lens element.

16. A catadioptric lens having an overall focal length f and capable of forming an image of an object and comprising, along an optical axis:

1) a first lens group having an annular incident surface that is objectwise concave and upon which light from the object is first incident, and a most imagewise lens surface;

2) an annular main mirror arranged imagewise of said first lens group and having an objectwise concave reflective surface that reflects light objectwise;

3) a secondary mirror located objectwise of said annular main mirror and having an imagewise convex reflective surface that reflects light imagewise; and 4) a glass optical path within said first lens group from said annular incident surface to said main mirror to said secondary mirror and to said most imagewise lens surface of said first lens group, wherein said first lens group comprises, in order along the optical axis:

a) a first meniscus lens element;

b) a first negative lens element cemented to said first meniscus lens element; and c) a first positive lens element cemented to said negative lens element.

17. A catadioptric lens according to claim 16, further including a second lens group comprising, in order along the optical axis:

a) a second positive lens element spaced apart from said first positive lens element; and b) a second negative lens element cemented to said second positive lens element.

18. A catadioptric lens according to claim 16, further including a second lens group comprising, in order along the optical axis:

a) a second negative lens element spaced apart from said first positive lens element; and b) a third positive lens element spaced apart from said second negative lens element.

19. A catadioptric lens according to claim 18, wherein said second negative lens element is a meniscus lens element having an objectwise convex surface.

20. A catadioptric lens having an overall focal length f and capable of forming an image of an object and comprising, along an optical axis:

1) a first lens group having an annular incident surface that is objectwise concave and upon which light from the object is first incident, and a most imagewise lens surface;

2) an annular main mirror arranged imagewise of said first lens group and having an objectwise concave reflective surface that reflects light objectwise;

3) a secondary mirror located objectwise of said annular main mirror and having an imagewise convex reflective surface that reflects light imagewise; and 4) a glass optical Path within said first lens group from said annular incident surface to said main mirror to said secondary mirror and to said most imagewise lens surface of said first lens group, wherein said first lens group comprises, in order along the optical axis:

a) a first biconcave lens element; and b) a first biconvex lens element cemented to said first biconcave lens element.

21. A catadioptric lens according to claim 20, further including a second lens group comprising, in order along the optical axis:

a) a second biconcave lens element cemented to said first biconvex lens element; and b) a second biconvex lens element cemented to said second biconcave lens element.

22. A catadioptric lens having an overall focal length f and capable of forming, from an object, an image having a maximum image height, the catadioptric lens comprising, along an optical axis:

a) a first lens group having an objectwise concave annular incident with a radius of curvature $r_a$ upon which light from the object is first incident, and a most imagewise lens surface;

b) an annular main mirror arranged imagewise of said first lens group and having an objectwise concave reflective surface with a radius of curvature $r_b$ that reflects light objectwise;

c) a secondary mirror located objectwise of said annular main mirror and axially spaced therefrom by a distance A, said secondary mirror having an imagewise convex reflective surface with a radius of curvature $r_c$ that reflects light imagewise;

d) a glass optical path within said first lens group from said incident surface to said main mirror to said secondary mirror and to said most imagewise lens surface of said first lens group; and e) wherein at least one of the following design conditions are satisfied:

$$0.5 < |r_a/f| < 1$$

$$|\theta| < 7°$$

$$-0.4 < (r_a - r_b)/(r_a + r_b) < -0.19$$

$$-0.3 < (r_b - r_c)/(r_b + r_c) < 0.3$$

$$0.2 < A/f < 0.6$$

wherein θ is an angle, measured with respect to the optical axis, of a principal ray associated with the maximum image height.

23. A catadioptric lens according to claim 22, further comprising a second lens group arranged imagewise of said most imagewise lens surface of said first lens group.

24. A catadioptric lens according to claim 23, wherein said second lens group includes two or more lens elements.

25. A catadioptric lens according to claim 24, wherein said second lens group includes a cemented doublet.

* * * * *